United States Patent Office 2,774,792
Patented Dec. 18, 1956

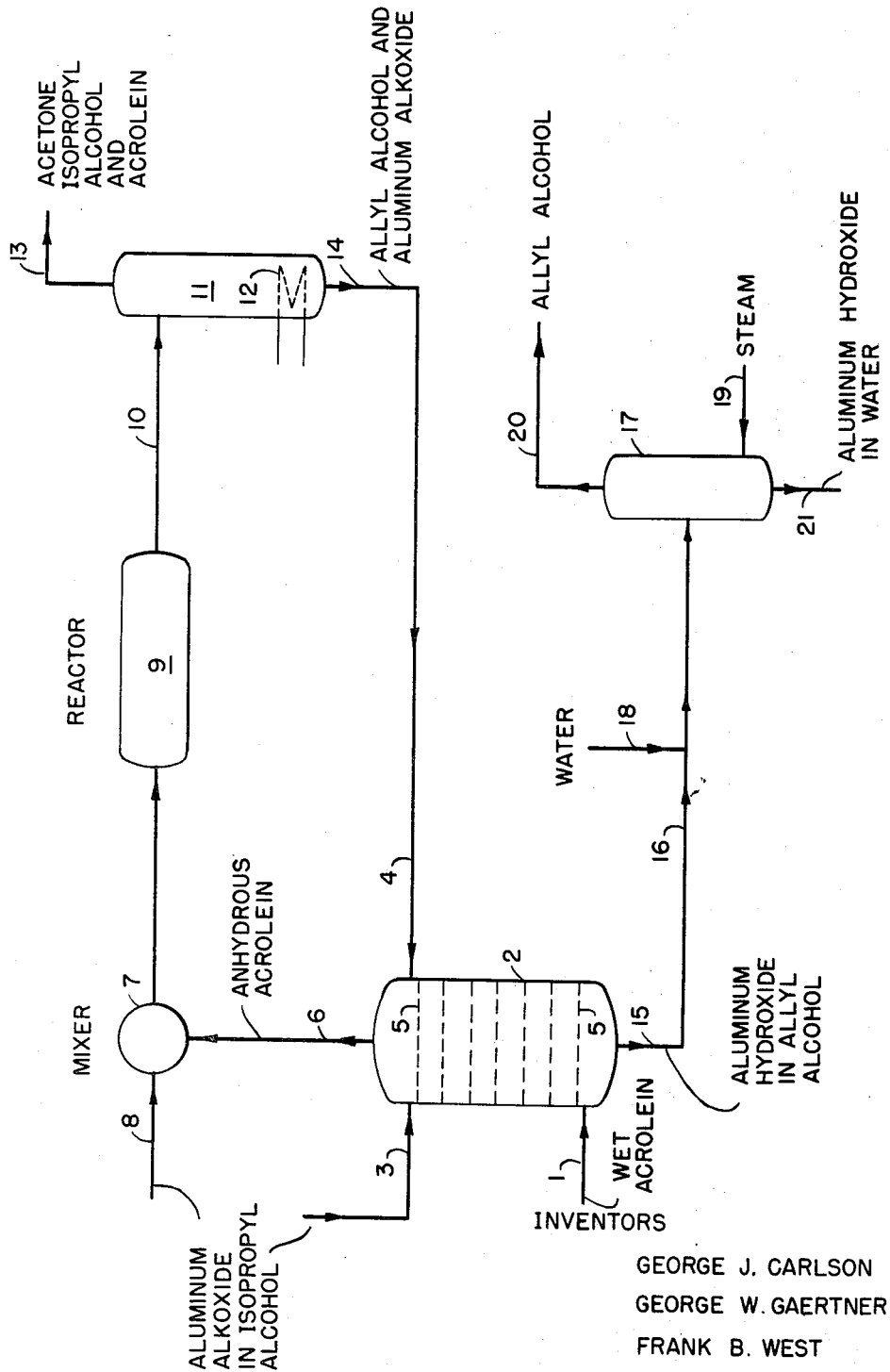

2,774,792

PROCESS FOR DRYING CARBONYLIC COMPOUNDS

George J. Carlson, Berkeley, George W. Gaertner, Oakland, and Frank B. West, Berkeley, Calif., assignors to Shell Development Company, New York, N. Y., a corporation of Delaware Application September 3, 1954, Serial No. 454,012

9 Claims. (Cl. 260—601)

This invention relates to the removal of water from organic liquids. It deals particularly with an improved method of producing substantially anhydrous liquids from carbonylic compounds containing minor amounts of water which are difficult to remove.

Although there are well known methods which are suitable for removing the bulk of the water from the majority of wet organic liquids, it has long been recognized that the removal of the last few percent of such water is quite difficult. This is particularly the case with those carbonylic compounds which are highly reactive and tend to undergo undesirable conversion during water removal. Yet, for many uses, it is necessary that organic liquids be substantially anhydrous, that is, contain less than about 0.1% by weight of water. In such cases resort has often been had to treatment with drying agents such as calcium chloride, sodium or potassium hydroxide, dehydrated sodium or magnesium sulfate, or like solid materials which are capable of absorbing moisture. All such previous methods of drying involve certain difficulties when applied to reactive carbonyl compounds. In particular, drying with adsorptive solids is rather slow because uniform contact of the organic liquid with the adsorptive material is hard to achieve, and considerable loss of starting carbonyl compound may be encountered in some of the drying methods.

It is an object of the present invention to provide a method of drying carbonylic compounds which avoids the objectionable features of the prior procedures. More specifically, it is an object of the invention to provide a drying process whereby moisture can be rapidly and efficiently removed from carbonylic compounds. A special object is the provision of an improved method of drying aldehyde and ketone compounds which, because of their reactivity, offer special problems in water removal by prior methods. Still another special object is to provide an improved method of drying which is particularly useful in preparing carbonylic feed stocks for processes involving reaction of aluminum alcoholates with such carbonylic feed material. Still other objects and advantages of the process of the invention will be apparent from the following description.

It has now been found that reactive carbonyl compounds can be successfully dried by means of aluminum alcoholates. This is quite unexpected for, although other types of alcoholates such as magnesium ethylate have been used in drying liquids with which they are non-reactive, for instance, alcohols, aluminum alcoholates are known to react with carbonyl compounds, and it might have been predicted that excessive loss of the starting carbonylic material would result from any addition of aluminum alcoholates. It has been discovered, however, that aluminum alcoholates can be used to selectively react with the water present in carbonyl compounds without substantial conversion of the carbonyl content so as to obtain an anhydrous product with negligible loss. In this method of drying the aluminum alcoholate reacts with the water present to form aluminum hydroxide which is precipitated and alcohol corresponding to the alcoholate used in accordance with the equation:

$$Al(OR)_3 + 3H_2O \rightarrow Al(OH)_3 + 3R\text{—}OH$$

It has been discovered that, in spite of the high reactivity of aldehydes and ketones with aluminum alcoholates, these alcoholates react even faster with water and that, by control of the temperature of operation, the time of treatment and the amount of aluminum alcoholate which is added, the water can be successfully converted with minimum undesirable side reaction of the carbonyl compound or compounds present. These are interdependent variables, each of which can vary over a considerable range when properly coordinated with the other two variables. Thus, larger amounts of aluminum alcoholates can be safely used when the time of treatment is made shorter and/or the temperature is reduced. Alternatively, by employing amounts of aluminum alcoholate not greatly in excess of the stoichiometric requirement for reaction with the water, longer times of contact can be tolerated. In any case, it is desirable to add an amount of aluminum alcoholate at least equal to 0.8 of the stoichiometric requirement for reaction with the water present in the carbonylic compound being dried. For more complete removal of water, it is preferred to use an excess of aluminum alcoholate over the stoichiometric requirement for reaction with the water, but such excess should not be greater than 0.02 mole of aluminum alcoholate per mole of carbonyl compound present. The preferred amount of aluminum alcoholate is from approximately the stoichiometric amount for reaction with the water to about 0.01 mole, most preferably about 0.005 mole, of aluminum alcoholate per mole of carbonyl compound in excess of the stoichiometric requirement for reaction with the water. With these amounts of aluminum alcoholate one can use temperatures within the range of about 0° to 80° C. by proper coordination of these variables, as pointed out above. It is usually desirable to maintain a relatively low temperature during contact of the aluminum alcoholate with the carbonyl compound. Temperatures in the range of about 0° to 60° C. are preferred, and more preferably about 20° to 45° C. are used.

The time of treatment of the carbonyl compound with aluminum alcoholate is dependent upon the amount of such alcoholate employed. Where amounts of aluminum alcoholate approximating the stoichiometric requirement for reaction with the water or smaller amounts are used, the time can be extended several fold without any undesirable conversion of carbonyl compound as long as the treatment is carried out at temperatures at which the carbonyl compound is normally stable. It is always preferred to operate at temperatures at which the carbonyl compound being dried is normally stable, i. e., undergoes negligible reaction in the absence of the present treatment. When using an excess of aluminum alcoholate over the stoichiometric amount for reaction with water to form aluminum hydroxide, as is generally preferred, the time of treatment should be limited in accordance with the amount of such excess and temperature. With an excess of aluminum alkoxide of about 0.01 to 0.02 mole per mole of carbonyl compound, the time of treatment should be as short as possible and the temperature should preferably be kept below 30° C. Longer times can be used when the preferred smaller excess of aluminum alcoholate is employed. In general, treatment times of the order of one or two seconds up to 15 to 30 minutes or more can be used, although times of about 0.1 to 5 minutes are usually preferred. The particular combination of reaction temperature, amount of aluminum alcoholate and time of contact which will be most satisfactory will also be influenced by the reactivity of the carbonyl compound which is being dried, the amount of water which is to be removed from it and the method chosen for carrying out the drying step. Whatever the procedure adopted for carrying out the drying, it is desirable to provide uniform mixing of the aluminum alcoholate with the wet carbonylic compound under treatment.

Especially where the process is being applied to the drying of carbonylic compounds intended for reaction with or under the catalytic influence of an aluminum alcoholate or other reactions in which the aluminum hydroxide and alcohol formed in the drying step are not detrimental, the new method of drying can be successfully carried out by admixing a controlled amount of aluminum alkoxide with the wet carbonylic compound and passing the resulting mixture to the reaction stage of the process without removing the aluminum hydroxide and alcohol formed from the dried carbonylic compound. In using this modification of the invention for the drying of aldehydes and ketone, the amount of aluminum alcoholate should be sufficient to substantially completely remove the water but must not be so great as to result in the formation of soluble aluminum hydroxy alcoholates, $Al_n(OH)_x(OR)_{3n-x}$, where R represents the radical of the alcohol from which the alcoholate is derived. It has been found that these hydroxy alcoholates tend to cause side reactions resulting in loss of the desired product during the subsequent reaction of the anhydrous aldehyde or ketone. It is therefore preferred, when treating reactive aldehydes and ketones in a combination process of this kind, to use an excess of not more than 0.01 mole of aluminum alcoholate per mole of aldehyde and/or ketone present over the stoichiometric requirement for reaction with the water therein.

Where desirable, the products of the reaction of the water can be removed from the anhydrous carbonyl compound produced. Thus, it is feasible to carry out the treatment in any suitable well stirred mixing vessel from which the mixture can be withdrawn continuously or batchwise for filtration or other methods of removing the aluminum hydroxide produced from the anhydrous liquid. The alcohol formed from the aluminum alcoholate can then be removed, if desired, from the dried product.

Another modification of the invention which has been found to be especially advantageous in the drying of aldehydes or ketones, especially those containing larger amounts of water, say about 0.5% to about 5% by weight of water, although it can also be used for drying carbonylic compounds of lower or higher water content, comprises carrying out the treatment with aluminum alkoxide while continuously removing the anhydrous carbonyl compound from the mixture. In this method of operation the time of contact of aluminum alkoxide with the carbonyl compound will generally be quite short, and larger excesses of alkoxide over the stoichiometric requirement for reaction with the water can usually be tolerated. Even so, it is preferred as a rule to use amounts between about the stoichiometric amount and about 50% in excess of such amount. Since, as previously indicated, it is desirable to avoid undue heating of the carbonyl compound in the presence of aluminum alcoholate, it is preferred to separate the dried product by vacuum flashing. For instance, the aluminum alcoholate can be fed at the top of a distillation column maintained under sufficiently low pressure to vaporize the anhydrous aldehyde or ketone which is taken off overhead after countercurrent contact with the alkoxide stream, the aluminum hydroxide produced being withdrawn with the bottoms. A temperature of about 10° to 40° C. is preferred in such cases.

The drying process of the invention can be carried out with any of the aluminum alcoholates. Most preferably, the alcoholate chosen is one derived from an alcohol which has a boiling point sufficiently removed from that of the organic liquid being dried so that ready separation of the alcohol produced in the treatment can be effected by distillation. Primary, secondary or tertiary alcohols can be used in preparing the alcoholates which can advantageously be produced by reacting the alcohols with metallic aluminum as described in copending application Serial No. 421,918, filed April 8, 1954. Aluminum alcoholates derived from alcohols having one to ten, preferably three to eight, carbon atoms per molecule are an advantageous sub-group of the useful alcoholates. While aliphatic alcohols are usually preferred for the preparation of the aluminum alcoholates used as drying agents, especially the secondary aliphatic alcohols, one can also use those derived from aralkyl alcohols such as benzyl alcohol, phenyl isopropyl alcohol, etc. Mixed as well as simple aluminum alkoxides can be used. Thus, methyl, ethyl, propyl, isopropyl, normal-, secondary-, tertiary- and isobutyl, the amyl, hexyl and higher alcohols can be used individually to produce aluminum alkoxides in which the three —OR groups are identical, or mixtures of two or more of these alcohols can be used with the result that more than one type of alkoxide group may be present in a given molecule of the aluminum alkoxide employed as the drying agent.

The aluminum alcoholate or alcoholate mixture is conveniently applied as a solution in a solvent which is miscible with the carbonylic compound which is being dried. The alcohol or alcohol mixture from which the aluminum alcoholate is derived is a particularly useful solvent. For the drying of the more highly reactive aldehydes and ketones, we prefer to use the aluminum alcoholate together with at least one mole of alcohol. Preferably a saturated aliphatic alcohol, most preferably a secondary alcohol of 3 to 6 carbon atoms, is used in a ratio of about 1 to 3 moles per mole of carbonylic compound present. However, where such alcohol solvent is insufficiently miscible with the organic liquid being treated, other solvents such as liquid hydrocarbons, ethers, esters, ketones, etc. can be successfully used.

A wide variety of different carbonylic compounds containing various amounts of water can be dried by the new method. It is especially suitable, however, in the preparation of feed stocks for use in processes in which an aluminum alcoholate is a reactant. This is not only because in such processes the aluminum alcoholate drying agent will be readily available as the fresh material used in such subsequent process but also because one can frequently employ aluminum alcoholate which has been through the reaction and which would otherwise be a waste product. The reduction of carbonyl compounds by reaction with aluminum alcoholates according to the method of Meerwein-Pondorff, as described in "Organic Reactions" edited by Roger Adams, vol. II, chapter 5 (Wiley, 1944), is one example of such an advantageous application of the invention, in which the new drying method cooperates with the reduction step to form a combination process giving high yields of alcohols more economically than has hitherto been possible. It is known to be very important in reactions of this type to use feed stocks which are substantially anhydrous, but it is especially difficult to achieve complete removal of water from the feed when using prior methods. It has been discovered that these last trace amounts of water, for instance, 0.3% or less, are disproportionately detrimental in these reactions. Such small amounts of water have been found to deactivate as much as 15 times the amount of aluminum alkoxide as is required for reaction therewith to form aluminum hydroxide according to the previously given equation. The drying method of the invention thus leads to unexpected savings of substantial magnitude when used in combination with a subsequent step of reaction of the dried carbonylic compounds with aluminum alkoxide which can be the same or different from that used for the drying. This type of combination process will therefore be used to illustrate this modification of the invention in connection with the attached drawing which is a flow sheet showing diagrammatically one assemblage of apparatus which is suitable for carrying out the process as applied to the reduction of acrolein to allyl alcohol. Acrolein is representative of a class of compounds which is particularly difficult to obtain in a substantially anhydrous form because of their reactivity under the usual conditions of water removal. These are the alpha, beta-ethylenic aldehydes and ketones having a terminal methylene group, that is, the compounds of the formula

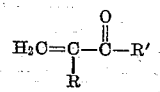

where R and R' represent hydrogen or hydrocarbon or substituted hydrocarbon radicals. Even under ordinary distillation conditions, serious losses may be encountered with these compounds due to their tendency to undergo polymerization or condensation. The drying of acrolein is further complicated by the fact that it forms an azeotrope with water on distillation from aqueous mixtures. This azeotrope contains 2.6% water when the distillation is carried out at atmospheric pressure and boils at 52.4° C., only 0.3° C. below the boiling point of pure acrolein.

In the drawing, 1 represents a supply line through which the wet acrolein feed to the system is introduced from a source not shown. The acrolein is fed to a flashing still 2, operated under vacuum by means not shown. Aluminum isopropoxide in isopropyl alcohol solution is supplied by line 3 to the top of still 2 at least during start up of operations. After operations are under way the supply of fresh aluminum isopropoxide from line 3 can be partly or completely replaced by aluminum alkoxide recovered from the reduction as explained hereinafter. This alkoxide is introduced into the top of vacuum flashing still 2 via line 4. The pressure in the still is controlled so as to maintain the temperature of the liquid at about 20° C. and the acrolein passes up through the still countercurrent to the descending stream of aluminum alkoxide which is fed, for instance, in an amount approximately 10% in excess of the stoichiometric requirement for reaction with the water introduced with the acrolein to form aluminum hydroxide, the necessary heat for the distillation of the acrolein being supplied by heating means not shown. Perforated plates or other suitable means 5 are provided in still 2 to insure intimate contact of the acrolein with the aluminum alkoxide. Substantially anhydrous acrolein is taken off overhead by line 6 and fed to mixer 7. In mixer 7 the dry acrolein is intimately contacted with a solution of aluminum isopropoxide in isopropyl alcohol. Generally, a molar excess of isopropyl alcohol to acrolein will be used. The mixture is fed to reactor 9 in which it is maintained for sufficient time to effect the desired reduction of the acrolein to allyl alcohol with simultaneous formation of acetone. The reacted mixture is withdrawn by line 10 to a distillation column 11, heated by a heating coil 12, in which the acetone produced is distilled off together with the unreacted isopropyl alcohol and acrolein, and removed by line 13 from the allyl alcohol and aluminum alkoxide which are withdrawn as bottom product by line 14. The required amount of this bottom product is fed by line 4 to the flashing still 2 to supply the aluminum alkoxide for removal of water from the acrolein feed to the system as previously described. Any excess of bottom product from column 11 over that required in the drying step can be fed by a line not shown to the product recovery unit 17. In this selective reaction of the aluminum alkoxide with water, the alkoxide is substantially converted to aluminum hydroxide and alcohol corresponding to alkoxide group or groups of the aluminum alkoxide, in the present instance chiefly allyl alcohol with lesser amounts of isopropyl alcohol. These products are removed as bottoms from still 2 by line 15 and are fed, together with any excess of bottoms from column 11, to column 17 by line 16 after dilution with sufficient water introduced by line 18 to insure suitable fluidity of the slurry throughout the operations. In column 17 the allyl alcohol product is distilled with steam introduced by line 19. The allyl alcohol is taken off overhead by line 20 along with any isopropyl alcohol present, while a slurry of aluminum hydroxide in water is removed as bottom product by line 21. In this way efficient use is made of the aluminum isopropoxide both for reduction of the acrolein and for drying the feed to the process.

Many variations can be made in this process. Depending upon the moisture content of the acrolein supplied by line 1 and the proportion of aluminum alcoholate to acrolein fed to mixer 7, it will sometimes be desirable to supply fresh aluminum alcoholate to flashing still 2 by line 3 continuously throughout the drying operation. Since it is desirable that the aluminum alcoholate be substantially completely dissolved in a suitable solvent when it is added to the organic compound being dried, it may in some cases be advantageous to add such solvent to the bottom product or still 11 by a line, not shown, connected to line 14. In the case illustrated in the drawing this is not essential since the aluminum alkoxide recovered from the still, unlike fresh aluminum isopropoxide, is sufficiently soluble in the allyl alcohol bottoms. In any case, it is important to control the amount of aluminum alcoholate added to the wet feed so as to insure substantially complete reaction of the water content without substantial formation of hydrated aluminum alcoholates. To this end, it is desirable to employ a mole ratio of aluminum alcoholate to water of 0.3 to 0.4 in the drying step and to limit the time of contact of acrolein and aluminum alcoholate to not more than about 2 minutes during the drying.

Instead of employing the flash still 2 for contacting the wet feed with the aluminum alcoholate, the treatment can be carried out in liquid phase in a stirred mixing vessel or the like. In such cases the aluminum hydroxide produced is preferably removed from the dried feed as by filtration or distillation before the feed stock is sent to the reduction stage. Where sufficient bottom product from still 11 is being fed directly to still 17 or other modified operation is used to avoid excessive build up of allyl alcohol product and/or aluminum hydroxide in the system, it is feasible to feed the dried acrolein to the reaction stage without separating therefrom the aluminum hydroxide and/or other materials introduced in the drying treatment.

The process as shown in the drawing can be carried out with other aldehydes or with ketones to produce other alcohols. Depending upon the relative boiling points of the various components present, it may be desirable to alter the distillation arrangements, however. Other examples of unsaturated aldehydes which can be successfully dried and reduced in this way are crotonaldehyde, methacrolein, alpha-ethly-acrolein, alpha-isopropyl-acrolein, alpha-chloroacrolein, tiglic aldehyde, citronellal, citral, cinnamaldehyde, and the like. The corresponding saturated aldehydes, for example, acetaldehyde, propionaldehyde, valeraldehyde, capric aldehyde, oenanthyl aldehyde, benzaldehyde, etc. can be similarly used. In the same way, ketones can be dried and reduced to the corresponding secondary alcohols. Thus, for instance, methyl ethyl ketone, diethyl ketone, ethyl isopropyl ketone, pivalone, methyl allyl ketone, cyclohexanone, acetophenone, phenyl acetone, acetyl acetone, and the like can be used as starting materials. Typical of the alpha,beta-ethylenic ketones which can be dried with special advantage by the new method because of their great reactivity under conventional drying conditions are methyl vinyl ketone, methyl isopropenyl ketone, divinyl ketone, mesityl oxide, prorone, phenyl vinyl ketone, vinyl cyclohexyl ketone, etc.

The same method of operation can be used in carrying out other reactions involving aluminum alkoxides and moisture-containing feed stocks. The production of allyl acrylate from acrolein is an example of such an advantageous application of the drying method of the invention. In this case the reaction carried out in units 7 and 9 can conveniently be conducted as described in Hearne-Schwarzer patent—U. S. 2,516,627. In the same way, when using wet methacrolein as the feed to flashing still 2, methallyl methacrylate can be produced in good yields by the new method.

The following examples show some of the advantages of the invention when carried out as the combination process which is the preferred application of the new drying method.

Example I

An acrolein feed which had been dehydrated by conventional methods to reduce the moisture content to 3.1% by weight (0.1 mole water per mole of acrolein) was treated as indicated with a 14% by weight solution of aluminum isopropoxide in isopropyl alcohol. A 10% excess of aluminum isopropoxide based on the water content of the acrolein was used. This corresponded to an excess of 0.0033 mole of aluminum alkoxide per mole of acrolein. The resulting mixture was distilled at about 20° C. under a pressure below 200 mm. mercury. A 96% recovery of acrolein containing 0.1% water was obtained.

The improvement obtainable by thus pretreating the acrolein to reduce its water content before reduction is shown by the following results obtained in tests in which the reduction was carried out by reacting the acrolein with a solution of aluminum isopropoxide in isopropyl alcohol. The acrolein conversion was 97% and the allyl alcohol yield was 88% with the acrolein of 0.1% water content. With acrolein dried by distillation only and containing 2.6% water, the acrolein conversion was 61% and the allyl alcohol yield only 59% under the same reduction conditions.

Example II

The desirability of maintaining the temperature below 50° C. during the drying with aluminum alcoholates is shown by the following results obtained in treating acrolein of 3.1% water content with aluminum isopropoxide in allyl alcohol. The aluminum isopropoxide, which was incompletely soluble in the allyl alcohol, was used in amounts of about 84% of the stoichiometric requirement for reaction with the water to 10% excess over the stoichiometric requirement and one mole of allyl alcohol was used per mole of acrolein present. When flashing off the dried acrolein at atmospheric pressure using indirect heating with steam at 80°–100° C., the acrolein recovery was only 80% compared with 94% when operating at 20° C. and a pressure below 200 mm. mercury.

The water removal in this process is made more efficient in both cases by adding sufficient isopropyl or secondary butyl alcohol or other solvent to bring the aluminum alcoholate completely into solution. Under such conditions removal of 97% of the original water content from this feed was readily achieved.

Example III

Acrolein which had been specially dried to reduce the moisture content to less than 0.5% by weight was treated with an excess of aluminum secondary butoxide over the stoichiometric requirement for reaction with the water present of about 0.002 mole per mole of acrolein, forming aluminum hydroxide and secondary butyl alcohol, and substantially completely eliminating the water. The dried acrolein was then reacted with aluminum secondary butoxide in secondary butyl alcohol without separating the aluminum hydroxide produced in the drying step. A 90.4% yield of allyl alcohol was obtained at an acrolein conversion of 84.8%. When the reaction was carried out with the wet acrolein under otherwise identical conditions, using the same total amount of aluminum secondary butoxide added all at once to the reaction mixture, the allyl alcohol yield was 77.5% and the acrolein conversion 46.8%.

Example IV

An acrolein feed, which had been dehydrated by cooling the azeotrope in a Dry Ice-acetone bath and filtering off the ice produced to reduce the moisture content to about 0.5% by weight, was treated with an isopropyl alcohol solution of aluminum isopropoxide containing 0.005 mole of the alkoxide per mole of alcohol. The aluminum isopropoxide was added in the stoichiometric proportion for reaction with the water to form aluminum hydroxide and isopropyl alcohol, and the mixture stirred at room temperature for about two minutes. The resulting substantially anhydrous acrolein was used as feed for the production of allyl alcohol without removing the aluminum hydroxide produced in the drying operation. Reduction was carried out by reacting the dry acrolein for one hour at 50° C. with a solution of aluminum isopropoxide in isopropyl alcohol. A total of 0.075 mole of aluminum isopropoxide and 2 moles of isopropyl alcohol per mole of acrolein were used in the process. The acrolein conversion was 91.2% and the allyl alcohol yield was 82.1%. Under otherwise identical conditions except that no pretreatment of the acrolein with aluminum alkoxide was carried out, the acrolein conversion was 87.1% and the allyl alcohol yield only 77.1%.

Example V

Acetone containing about 0.4% by weight of water was dried to 0.025% water content by treatment with an 8.3% by weight solution of aluminum isopropoxide in normal heptane. The aluminum isopropoxide was used in an excess over the stoichiometric requirement for reaction with the water corresponding to 0.0058 mole of isopropoxide per mole of acetone. The treatment was carried out by adding the aluminum isopropoxide solution to the acetone with thorough stirring and immediately beginning the distillation of the dry acetone at atmospheric pressure. There was no evidence of any substantial loss of acetone in the process.

The present method of drying carbonylic compounds is not restricted to the treatment of normally liquid carbonylic compounds but can be applied to the drying of solutions of solid carbonylic compounds dissolved in liquid solvents and to drying carbonylic compounds in the gaseous state. Still other variations in the process can be made without departing from the invention, which is not restricted to the procedures which have been described by way of illustration only nor by any theory proposed in explanation of the improved results which are obtained.

We claim as our invention:

1. A method of drying a lower molecular weight, normally liquid, monocarbonyl-substituted hydrocarbon which comprises contacting said carbonyl compound with an aluminum alcoholate of a monohydroxy-substituted hydrocarbon alcohol having one to ten carbon atoms per molecule in an amount between about the stoichiometric requirement for reaction with the water present to form aluminum hydroxide and an excess over such stoichiometric amount not greater than 0.02 mole per mole of carbonyl-substituted hydrocarbon at a temperature of about 0° C. to 45° C. whereby reaction of the aluminum alcoholate with the water takes place and aluminum hydroxide is formed without substantial conversion of said carbonylic hydrocarbon.

2. A method of removing water from aldehydes which comprises contacting a lower molecular weight, normally liquid alpha,beta-monoethylenic monoaldehyde-substituted hydrocarbon with an aluminum alcoholate of a monohydroxy-substituted hydrocarbon alcohol having one to ten carbon atoms per molecule in an amount between about the stoichiometric requirement for reaction with the water to form aluminum hydroxide and an excess over such stoichiometric amount not greater than about 0.005 mole per mole of aldehyde, at about 10° to about 45° C.

3. A method of removing water from a lower molecular weight, normally liquid monoaldehyde-substituted hydrocarbon which comprises vacuum distilling said aldehyde, passing the vapors countercurrent to a stream of aluminum alcoholate of a monohydroxy substituted hydrocarbon alcohol having one to ten carbon atoms per molecule containing an excess of said alcoholate over the stoichiometric requirement for selective reaction with the water present to form aluminum hydroxide, which excess is not greater than about 0.01 mole of alcoholate per mole of aldehyde at a temperature of about 10° to 40° C., and separately removing substantially anhydrous aldehyde vapors and aluminum hydroxide.

4. A method in accordance with claim 3 wherein acrolein containing not more than about 3% water is dried by contact at a temperature below 30° C. with aluminum alkoxide derived from a saturated aliphatic secondary alcohol of not more than six carbon atoms per molecule.

5. In a method of reacting a carbonyl compound with an aluminum alkoxide wherein water-containing lower molecular weight, normally liquid monocarbonyl-substituted hydrocarbon is used as feed, the improvement which comprises contacting said feed with aluminum alcoholate of monohydroxy-substituted hydrocarbon alcohol having one to ten carbon atoms per molecule in an amount between about the stoichiometric requirement for reaction with the water present to form aluminum hydroxide and an excess over such stoichiometric amount not greater than 0.02 mole per mole of carbonyl-substituted hydrocarbon at a temperature of about 0° to about 45° C. whereby selective reaction of the alcoholate with the water to form aluminum hydroxide is effected, and subsequently adding fresh aluminum alcoholate of monohydroxy-substituted hydrocarbon alcohol having one to ten carbon atoms per molecule to the thus dried carbonyl-substituted hydrocarbon and reacting the mixture.

6. In a method of reducing a water-containing lower molecular weight, normally liquid alpha,beta-monoethylenic monoaldehyde-substituted hydrocarbon to the corresponding alcohol by reaction with aluminum alkoxide, the improvement which comprises contacting said water-containing aldehyde with aluminum alcoholate of monohydroxy-substituted hydrocarbon alcohol having one to ten carbon atoms per molecule in an amount between about the stoichiometric requirement for reaction with the water to form aluminum hydroxide and an excess over such stoichiometric amount not greater than about 0.005 mole per mole of aldehyde, at about 10° to about 45° C., separating substantially anhydrous aldehyde from the mixture, adding a solution of an aluminum alcoholate of monohydroxy-substituted hydrocarbon alcohol having one to ten carbon atoms per molecule in the corresponding alcohol to the separated aldehyde and effecting said reduction with the resulting mixture.

7. In a method of producing allyl alcohol from water-containing acrolein by reaction with an aluminum alcoholate, the improvement which comprises contacting said acrolein with an aluminum alcoholate of the group consisting of aluminum isopropoxide and aluminum secondary butoxide using an amount of aluminum alcoholate between about the stoichiometric requirement for reaction with the water to form aluminum hydroxide and an excess over said stoichiometric requirement not greater than 0.01 mole per mole of acrolein, at about 10° to 30° C., adding to the resulting substantially anhydrous acrolein a solution of said aluminum alcoholate in the corresponding alcohol to effect said reduction of the acrolein to allyl alcohol.

8. A process in accordance with claim 7 wherein aluminum alkoxide recovered from said reduction of acrolein is contacted with the water-containing acrolein fed to the system.

9. A process in accordance with claim 7 wherein the aluminum alcoholate is fed at the top of a distillation column maintained under a subatmospheric pressure at which the acrolein is vaporized and taken off overhead after countercurrent contact with the aluminum alcoholate while the aluminum hydroxide produced is withdrawn with the bottoms.

References Cited in the file of this patent
UNITED STATES PATENTS 2,516,627    Hearne et al. _____ July 25, 1950

FOREIGN PATENTS 26,826    Great Britain _____ 1913

OTHER REFERENCES

Seligman et al.: Chem. Abstracts 12 (1918), p. 1737.
Child et al.: J. Am. Chem. Soc. 47 (1925), pp. 798–807.
Young et al.: J. Am. Chem. Soc. 58 (1936), pp. 100–104.